Figure 1:
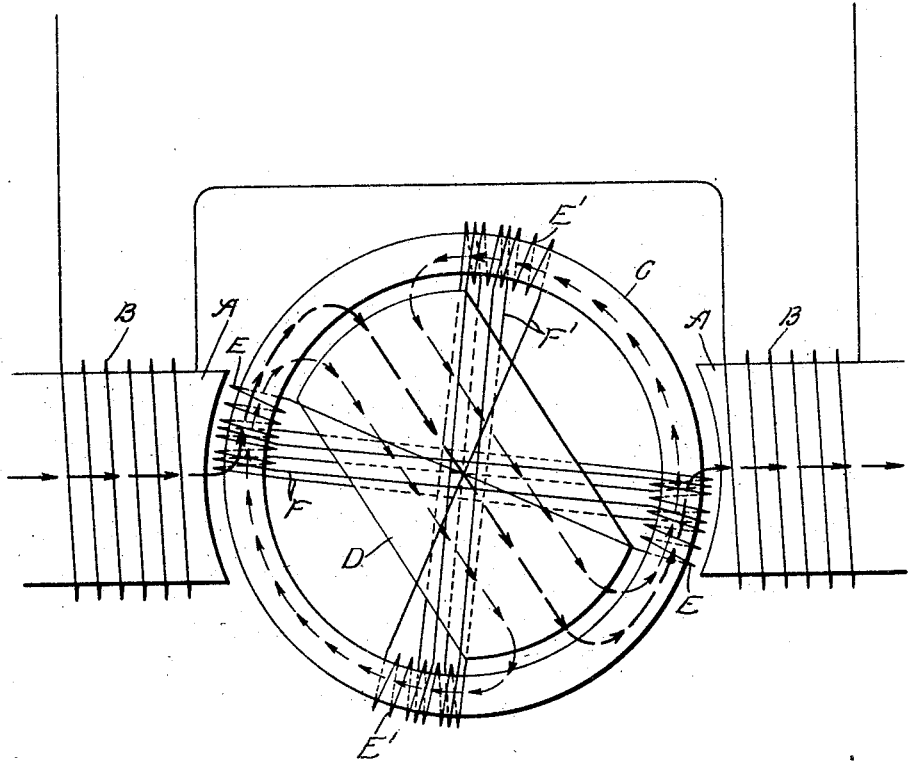

No. 854,739. PATENTED MAY 28, 1907.
L. A. HAWKINS.
ALTERNATING CURRENT MOTOR.
APPLICATION FILED SEPT. 10, 1906.

2 SHEETS—SHEET 1.

WITNESSES:

INVENTOR:
Laurence A Hawkins,
By
Att'y.

No. 854,789. PATENTED MAY 28, 1907.
L. A. HAWKINS.
ALTERNATING CURRENT MOTOR.
APPLICATION FILED SEPT. 10, 1906.

2 SHEETS—SHEET 2.

WITNESSES:
INVENTOR:
Laurence A. Hawkins,
By
Att'y.

UNITED STATES PATENT OFFICE.

LAURENCE A. HAWKINS, OF SCHENECTADY, NEW YORK, ASSIGNOR TO GENERAL ELECTRIC COMPANY, A CORPORATION OF NEW YORK.

ALTERNATING-CURRENT MOTOR.

No. 854,739. Specification of Letters Patent. Patented May 28, 1907.

Application filed September 10, 1906. Serial No. 333,916.

*To all whom it may concern:*

Be it known that I, LAURENCE A. HAWKINS, a citizen of the United States, residing at Schenectady, county of Schenectady, State of New York, have invented certain new and useful Improvements in Alternating-Current Motors, of which the following is a specification.

My invention relates to alternating-current motors, and its object is to provide a novel type of motor by means of which characteristics similar to those of a direct-current series motor are obtained without the use of a commutator.

The polyphase induction motor possesses, as is well known, speed-torque characteristics similar to those of a direct-current shunt motor,—that is, it is a practically constant speed machine. It, consequently, is not adapted for use in applications in which a characteristic similar to that of a direct-current series motor is desired,—that is, a characteristic with high starting torque, which falls off gradually as the speed increases. When such a characteristic has been desired in alternating-current motors, it has been the practice to provide the motor with a commutator. Two types of alternating-current commutator motors have been widely used. One is the simple series motor, and the other the repulsion motor in which the armature is short-circuited on a line at an angle to the primary magnetization.

Commutation in alternating-current machines presents difficulties not apparent in direct-current machines, and the object of my invention is to obtain the desired characteristics without employing a commutator. For this purpose I make use of the same general principle involved in the well known repulsion motor. If all the armature coils of a motor having a single-phase primary member are directly short-circuited on themselves no starting torque is produced, but if by means of a commutator, a portion only of the coils are short-circuited, or if all the coils are short-circuited on a line at an angle to the line of primary magnetization, the desired characteristic is obtained. By my invention I produce a distortion of the current distribution in the armature similar to that produced in the repulsion motor, but instead of employing a commutator to secure this result I provide a magnetic shunt so arranged that the secondary coils are unequally energized by the primary coils. In this way a magnetization of the secondary member at an angle to that of the primary member is produced, and the desired characteristics secured.

Figure 2:
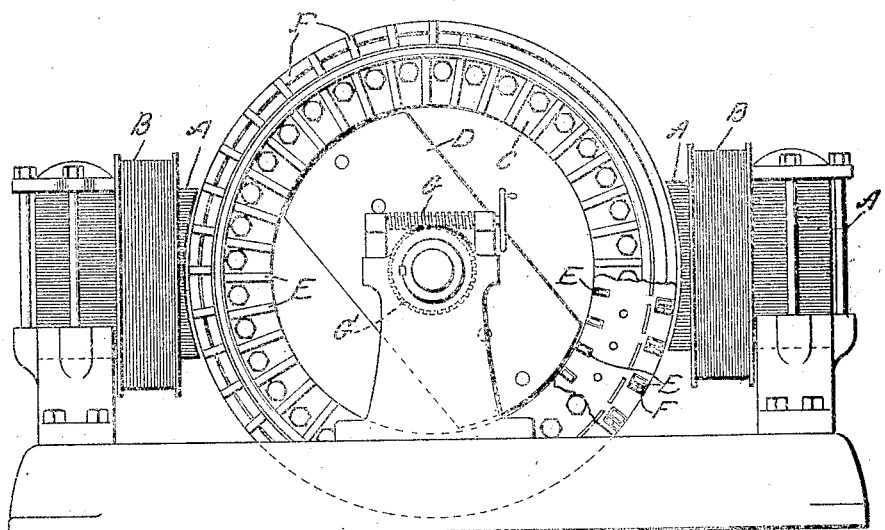
Figure 3:
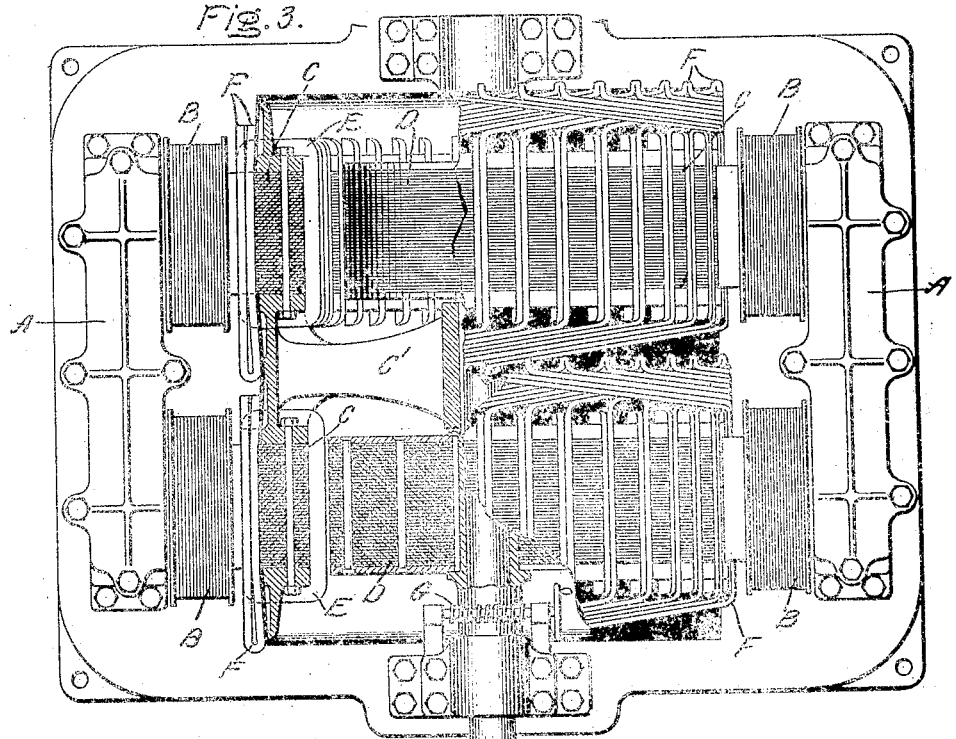

My invention will best be understood by reference to the accompanying drawings, in which Figure 1 is an explanatory diagram; Fig. 2 shows a side elevation of an alternating-current motor constructed in accordance with my invention; and Fig. 3 shows a plan view of the same, partly in cross-section.

In Fig. 1, A represents the primary member, which is preferably stationary and carries the primary winding B, which is connected to the single phase source of supply. C represents a Gramme-ring member which is relatively rotatable with respect to the primary member A. D represents a flux shunt, which is stationary with respect to the primary member A. The Gramme-ring member C carries distributed sets of ring-wound coils, of which two sets E and E¹ are shown in Fig. 1, and also drum-wound coils F and F¹, which are connected in series with the ring-wound coils E and E¹, so as to form independent closed circuits. Considering the primary flux, which enters member C from one of the primary poles A, it will be seen that if there were no windings on the Gramme-ring, the greater portion of the flux would pass through the Gramme-ring member in both directions to the diametrically-opposite point and thence to the opposite pole A, while a comparatively small portion would be shunted through the member D.

As will be hereafter explained, the action of the closed circuits on the secondary member results in forcing the greater part of the primary flux through the member D, so that the path of the primary flux is as indicated by the heavy dotted line and arrow-heads. Neglecting for the moment the action of the secondary circuits in producing this distribution of the flux, and considering only the effect of this flux upon the closed circuit formed by the coils E E and the drum-wound coil F, it will be seen that the coils E E act as secondary windings for this flux, and since the two coils E E are connected so that their induced electromotive forces are in series, they force a current through the drum-wound coil F, which produces a magnetization at right-angles to the primary magnetization issuing from the poles A. Consequently the current in the coil F co-acts with the current in the primary winding and produces a torque upon the secondary member C.

It will be seen that the coil F is substantially parallel to the line of primary magnetization, and consequently it is in non-inductive relation to the primary flux. In other words, the ring-wound coils E act as transformer coils for producing the induced electromotive force, while the coil F acts as a motor coil for producing the motor torque. The coils E and F should be displaced from each other, as indicated in Fig. 1, so that the coils E may occupy the most favorable position for effective transformer action,—that is, a position between the pole A and the adjacent pole of the member D, while the coil F is in the most effective position for motor action,—that is, substantially at right-angles to the line joining the poles A A.

It will further be seen that the current in the closed circuit formed by the coils E, E and F, and consequently the torque, will be greatest at starting, since when the member C is at rest there is no counter-electromotive force due to rotation in its circuit. As the member C begins to revolve, however, the coil F cuts the primary field, and has induced in it an electromotive force which opposes the electromotive force induced by transformer action in the coils E E. Rotation has but little effect on the electromotive forces induced in the coils E E, since while the outer sides of these coils are cutting the field between the pole A and the member C the inner sides of these coils are moving in the same direction through a practically equal field between member C and the stationary member D. Consequently the induced electromotive force in coil E remains practically constant, while a counter-electromotive force due to rotation exists in the coil F; so that the resultant current in the closed circuit formed by these coils decreases as the motor speeds up. In other words, the speed-torque characteristic is the same as that in the alternating-current repulsion motor with a commutator, or in the direct-current series motor.

In the above discussion it has been assumed that practically all the primary flux passes through the shunting member D. That this will in fact be the case will be seen by considering the effect on the primary flux of the closed circuit formed by the coils E′ E′ and F′. If the coils E′ E′ were short-circuited directly on themselves, it is obvious that they would act as flux screens to divert the primary flux through the flux shunt, and if the number of turns in the coils E′ E′ is great with respect to the number of turns in the coils F′, they will still act as though practically short-circuited.

Moreover, by connecting the coils E′ and F′ in opposition with respect to the primary flux passing through them, as shown in Fig. 1, the flux passing through the coils E′ will be in opposition to the direction of the primary flux, and will close itself through the flux shunt D, as indicated by the light dotted lines and arrow-heads. This flux is in the same direction as the primary flux in the member D and in the portion of the Gramme-ring occupied by the coils E E; and the amount of this flux multiplied by the number of turns in the coils E′ E′ will be practically equal to the primary flux multiplied by the number of turns in the coils F′. The effect of this flux on the closed circuit formed by coils E, E, and F, is to increase the electromotive force induced by transformer action in coils E, E, and also to produce in these coils a counter-electromotive force due to rotation which is in series with that produced in coil F by cutting the primary field. Thus, the closed circuits, when they reach the position shown by the coils E′ E′ of Fig. 1, act, as has been heretofore stated, to divert practically all the primary flux to the shunting member D. Consequently, this arrangement of magnetic circuits and closed electrical circuits produces an effective inequality of primary flux distribution in the secondary member, which results in a motor torque having the characteristics above described.

A suitable motor construction, in accordance with the principles above explained, is shown in Figs. 2 and 3. In the construction shown in these figures, which is particularly adapted for bi-polar motors, the motor comprises in effect two structures, each similar to that shown diagrammatically in Fig. 1. The primary member comprises two stationary C-shaped laminated members shown arranged facing each other in a horizontal plane, so as to form two pairs of opposite poles. On these poles is placed the primary winding B. Two laminated Gramme-ring members C are supported from a central spider C¹, on the shaft C², and carry the ring-wound coils E and the drum-wound coils F in suitable slots. The stationary flux shunts D are sleeved on the shaft and are adjustably held in position by means of the worms G engaging gears G′, shown in dotted lines in Fig. 2, on the sleeves of the members D. The operation of the motor may be adjusted by adjusting the position of the members D, and the direction of rotation of the motor may be reversed by reversing the position of these members with respect to the primary poles.

While a bi-polar construction is shown in the drawings, it will be understood that my invention is equally applicable to multi-polar machines.

Furthermore, the construction shown is only one of many in which my invention may be embodied. Accordingly, I do not desire to limit myself to the particular construction and arrangement of parts here shown, but aim in the appended claims to cover all modifications which are within the scope of my invention.

What I claim as new and desire to secure by Letters Patent of the United States, is,—

1. In an alternating-current motor, a primary winding, a secondary winding comprising independent coils relatively rotatable with respect to the primary winding, a magnetic circuit arranged to shunt the primary flux away from a portion of said coils, and independent cross-magnetizing coils connected in series with the several secondary coils.

2. In an alternating-current motor, a primary member, a winding thereon, a secondary member relatively rotatable with respect to the primary member, the magnetic circuit for the primary flux being arranged to produce unequal magnetizations in different portions of the secondary member, independent coils distributed on the secondary member, and independent cross-magnetizing coils on the secondary member connected in series with the several secondary coils.

3. In an alternating-current motor, a primary winding, a secondary winding comprising distributed coils connected to form a plurality of independent closed circuits, a magnetic circuit for said windings arranged to produce an unequal distribution of the primary flux in said coils, and cross-magnetizing coils included in said closed circuits.

4. In an alternating-current motor, a primary winding, a relatively rotatable second winding, comprising distributed coils connected to form independent closed circuits, and a magnetic flux-shunt arranged at an angle to the line of magnetization produced by the primary winding and adapted to form a shunt for the primary flux with respect to a portion of the secondary member.

5. In an alternating-current motor, a primary member, a winding thereon, a Gramme-ring secondary member relatively rotatable with respect to the primary member, ring-wound coils distributed on the secondary member, drum-wound coils connected in series with the ring-wound coils to form a plurality of independent closed circuits, and a magnetic flux-shunt arranged at an angle to the line of magnetization produced by the primary winding and adapted to form a shunt for the primary flux with respect to a portion of the secondary member.

6. In an alternating-current motor, a primary member, a winding thereon, a Gramme-ring secondary member relatively rotatable with respect to the primary member, ring-wound coils distributed on the secondary member, drum-wound coils connected in series with the ring-wound coils to form a plurality of independent closed circuits, and means for producing an unequal distribution of the primary flux in the Gramme-ring member.

7. In an alternating-current motor, a primary member, a winding thereon, a Gramme-ring secondary member relatively rotatable with respect to the primary member, ring-wound coils distributed on the secondary member, drum-wound coils connected in series with the ring-wound coils to form a plurality of independent closed circuits, and means for producing an unequal distribution of the primary flux in the Gramme-ring member, the ring-wound and drum-wound coils being oppositely-wound with respect to the primary flux in said Gramme-ring member.

In witness whereof, I have hereunto set my hand this 8th day of September, 1906.

LAURENCE A. HAWKINS.

Witnesses:
 HELEN ORFORD,
 G. C. HOLLISTER.